United States Patent Office 2,715,064
Patented Aug. 9, 1955

2,715,064

METHOD OF PRODUCING SILICON STEEL

Lawrence M. Burns, Apollo, Pa.

No Drawing. Application September 1, 1954,
Serial No. 453,676

2 Claims. (Cl. 75—129)

This invention relates to the production of the higher grades of electrical steels, such as transformer grades containing 3 to 4.5% silicon.

In making transformer grades of silicon steel, low-carbon steel, freed as far as possible from metalloids and alloying elements, is prepared in an open hearth furnace and then tapped in a holding ladle containing suitable amounts of ferrosilicon. Highly oxidized steel entering the ladle causes a pronounced silicothermic reaction, and silicon is known to possess a high heat of solution when it dissolves in iron. In combination, these two sources of heat raise the temperature of the metal in the ladle much higher than the temperature it had when leaving the furnace.

The temperature which the steel reaches on completion of silicon solution is too high for teeming and therefore the metal must be first cooled. This is achieved by holding it in the ladle, in which it had been originally tapped, for 10 to 90 minutes, after which the steel is transferred into a teeming ladle and distributed into the molds in the usual way. Since the steel temperature is too high for ladle refractories, particularly for the stopper rod and teeming nozzle, and time must be saved in reladling, the first ladle is usually of the lip-pouring type. This results in a pronounced lowering of the life of the refractory linings of the ladles and an undesirable increase of non-metallic inclusions in the steel.

It is accordingly an object of the present invention to provide a method of making silicon steels which eliminates the necessity of holding such steels in the ladle for long periods of time.

It is another object to provide a method of producing silicon steel characterized by relative freedom from non-metallic inclusions.

It is a further object of the present invention of prolonging the linings of ladles used in producing silicon steels.

I have discovered that these objects can be accomplished and numerous ancillary benefits obtained by adding to the molten steel while in the first ladle a quantity of scrap sufficient to reduce the temperature of the metal to within the range suitable for direct teeming. Scrap addition may be prior to the introduction of steel in the ladle or during the process of teeming.

Scrap selected for the addition should have a composition suitable for meeting specific requirements of any given heat of silicon steel. It should be free from alloying constituents undesirable in this grade of steel from the magnetic standpoint and preferably contain a low carbon concentration. For most applications silicon steel scrap is to be preferred. Its use simplifies composition adjustment in the finished product and its composition fits well into the practice of steelmaking used in this case. While higher or lower percentage of silicon than that desired in the finished product present in the scrap can be tolerated in the light of possible conventional adjustment in the composition, it is preferable to use scrap having substantially the same silicon concentration as the metal being made. Using the scrap for cooling silicon steel in the ladle offers particular advantages for utilization of scrap which otherwise can only be disposed of with difficulty. Scrap resulting from making transformer grades of steel carrying three to four per cent silicon is not suitable for use in conventional basic open hearth furnaces, since it results in excessive amount of silica corroding the furnace lining, and must be discarded or sold at a great reduction in price.

Both iron and silicon values of such a scrap are completely recovered in the ladle, since the reactions involved are reduced to a simple solution. The high-silicon molten metal in the ladle is fully deoxidized, so that no oxidation of any scrap constituents can take place here. This permits the use of sheet trimmings with equally good results as of heavier sections.

With a judicious selection of the amount and quality of scrap addition, it becomes possible to reduce the holding time in the ladle to the extent assuring safe refractory life and in this manner to eliminate the necessity for reladling calling for the use of two different ladles.

The amount of scrap added is, of course, largely dependent on the amount of ferrosilicon added and the degree of oxidation of the steel as it leaves the furnace so as to offset the rise in temperature produced by exothermic reactions. Thus, cold scrap in an amount by weight at least equal to the weight of ferrosilicon should be added, and ordinarily the weight ratio of scrap to ferrosilicon can be over 2:1. The addition is controlled to quickly reduce the temperature of the metal in the ladle to a proper teeming temperature, usually around 2900° F. or below.

I have found that by such additions, the necessity of double ladling is eliminated, the life of the ladle linings is materially increased and also the quality of the steel due to freedom from nonmetallic inclusions is greatly improved. A material saving in time is also effected since the ladle can be teemed as soon as it is removed from the casting pit.

While I have shown and described a specific embodiment of my invention, it will be understood that this embodiment is merely for the purpose of illustration and description and that various other forms may be devised within the scope of my invention, as defined in the appended claims.

I claim:

1. Method of producing silicon steel containing over 3% silicon comprising forming a melt of low metalloid, low-carbon steel, tapping said steel into a ladle, adding sufficient ferrosilicon to bring the silicon content to above 3%, adding sufficient cold silicon steel scrap to reduce the temperature of the steel in the ladle to a temperature suitable for teeming and then teeming said steel into ingot molds.

2. Method of producing silicon steel containing over 3% silicon comprising forming a melt of low metalloid, low-carbon steel, tapping said steel into a ladle, adding sufficient ferrosilicon to bring the silicon content to above 3% and raise the temperature to above 2900° F., adding sufficent cold silicon steel scrap to reduce the temperature of the steel in the ladle to a temperature below about 2900° F. and then teeming said steel into ingot molds.

No references cited.